(12) United States Patent
Jochnowitz

(10) Patent No.: US 10,694,783 B2
(45) Date of Patent: Jun. 30, 2020

(54) FEEDBACK CONTROLLED RTD ADJUSTMENT FOR AN AEROSOL-GENERATING DEVICE

(71) Applicant: Philip Morris Products S.A., Neuchatel (CH)

(72) Inventor: Evan Jochnowitz, Basel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/551,223

(22) PCT Filed: Feb. 25, 2016

(86) PCT No.: PCT/EP2016/054035
§ 371 (c)(1),
(2) Date: Aug. 15, 2017

(87) PCT Pub. No.: WO2016/135271
PCT Pub. Date: Sep. 1, 2016

(65) Prior Publication Data
US 2018/0020733 A1  Jan. 25, 2018

(30) Foreign Application Priority Data
Feb. 27, 2015  (EP) .................................... 15156923

(51) Int. Cl.
  *A24F 13/00*  (2006.01)
  *A24F 47/00*  (2020.01)
  (Continued)

(52) U.S. Cl.
  CPC ............ *A24F 47/008* (2013.01); *F22B 1/284* (2013.01); *G01F 1/00* (2013.01); *H05B 3/44* (2013.01)

(58) Field of Classification Search
  USPC ................................................. 131/328–329
  See application file for complete search history.

(56) References Cited

U.S. PATENT DOCUMENTS

| 3,860,012 A | 1/1975 | Selke |
| 3,894,544 A | 7/1975 | Egri |

(Continued)

FOREIGN PATENT DOCUMENTS

| CN | 1708241 A | 12/2005 |
| CN | 101241063 A | 8/2008 |

(Continued)

OTHER PUBLICATIONS

International Search Report and Written Opinion dated Apr. 29, 2016 in PCT/EP2016/054035, filed Feb. 25, 2016.

(Continued)

*Primary Examiner* — Phuong K Dinh
(74) *Attorney, Agent, or Firm* — Oblon, McClelland, Maier & Neustadt, L.L.P.

(57) ABSTRACT

An electrically heated aerosol-generating device and system are provided, the device including an outer housing having a cavity configured to receive an aerosol-generating substrate; an electrical heater including at least one heating element configured to heat the aerosol-generating substrate in the cavity to generate an aerosol; at least one air inlet, at least one air outlet; an airflow pathway extending from the at least one air inlet, through the cavity, to the at least one air outlet; means for determining the resistance-to-draw of the airflow pathway; and means for adjusting the resistance-to-draw of the airflow pathway in dependence on the determined resistance-to-draw. The system comprises an electrically heated aerosol-generating device and an aerosol-forming substrate comprising tobacco.

14 Claims, 3 Drawing Sheets

(51) Int. Cl.
 *F22B 1/28* (2006.01)
 *G01F 1/00* (2006.01)
 *H05B 3/44* (2006.01)

(56) References Cited

U.S. PATENT DOCUMENTS

| | | | |
|---|---|---|---|
| 5,498,855 | A | 3/1996 | Deevi et al. |
| 5,514,630 | A | 5/1996 | Willkens et al. |
| 5,724,998 | A | 3/1998 | Gellatly et al. |
| 2013/0213419 | A1 | 8/2013 | Tucker et al. |
| 2014/0238423 | A1 | 8/2014 | Tucker et al. |
| 2014/0261493 | A1 | 9/2014 | Smith et al. |
| 2014/0334802 | A1 | 11/2014 | Dubief |
| 2014/0338686 | A1 | 11/2014 | Plojoux et al. |
| 2015/0327596 | A1* | 11/2015 | Alarcon ............. A24F 47/008 131/328 |
| 2016/0183596 | A1* | 6/2016 | Rado ................. A24F 47/008 392/395 |

FOREIGN PATENT DOCUMENTS

| | | |
|---|---|---|
| CN | 202994655 U | 6/2013 |
| CN | 103859603 A | 6/2014 |
| CN | 103974635 A | 8/2014 |
| CN | 104135881 A | 11/2014 |
| CN | 104244749 A | 12/2014 |
| EP | 2 816 913 A2 | 12/2014 |
| GB | 983928 A | 2/1965 |
| GB | 2 513 639 A | 11/2014 |
| JP | 2011-515093 | 5/2011 |
| KR | 20-2011-0006928 U | 7/2011 |
| KR | 10-1316347 B1 | 10/2013 |
| WO | WO 03/095688 A2 | 11/2003 |
| WO | WO2008/133091 | 11/2008 |
| WO | WO 2013/083638 A1 | 6/2013 |
| WO | WO 2013/190036 A1 | 12/2013 |

OTHER PUBLICATIONS

Combined Chinese Office Action and Search Report dated Aug. 30, 2019, in Patent Application No. 201680010450.6 (with English translation), citing documents AA and AO-AU therein, 11 pages.
Japanese Office Action dated Feb. 17, 2020, with English translation, in counterpart Japanese Patent Application No. 2017-545579, citing documents AO and AP therein (5 pages).

\* cited by examiner

FEEDBACK CONTROLLED RTD ADJUSTMENT FOR AN AEROSOL-GENERATING DEVICE

TECHNICAL FIELD

The present invention relates to an electrically-heated aerosol-generating device, such as a smoking device. In particular, the invention relates to a device having a feedback control system for adjusting the resistance-to-draw of the device during use.

DESCRIPTION OF THE RELATED ART

Electrically heated smoking systems typically include a power supply, such as a battery, connected to a heater to heat an aerosol-forming substrate, to form the aerosol which is provided to the smoker. In operation, these electrically heated smoking systems typically provide a high power pulse to the heater to provide the temperature range desired for operation and to release volatile compounds. Electrically heated smoking systems may be reusable and may be arranged to receive a disposable smoking article containing the aerosol-forming substrate to form the aerosol. Alternatively, loose tobacco may be provided adjacent the electrical heater. Where loose tobacco is used, typically the user fills a cavity with the required amount of tobacco before using the device. The loose tobacco is then heated to a temperature sufficient to volatilise the desirable volatile compounds in the tobacco without reaching a temperature sufficient for combustion of the tobacco.

Such systems produce highly varied results depending on many factors only in the control of the user, such as the specific properties, and type, of the tobacco used, the quantity of tobacco placed in the cavity, and how much the user compresses the tobacco when providing it in the cavity. In particular, the resistance-to-draw can vary significantly with these factors which is not desirable.

Aerosol-generating devices having a resistance-to-draw which can be varied by the user are known. However, these devices are manually adjustable, such as by a rotatable element, and generally cannot be easily adjusted during use, or with any particular accuracy or consistency.

Therefore, it would be desirable to reduce the variability of the resistance-to-draw, both during a single use and between uses, of an aerosol-generating device.

SUMMARY

According to one aspect of the present invention, there is provided an electrically heated aerosol-generating device. The device comprises: an outer housing having a cavity for receiving aerosol-generating substrate; an electrical heater comprising at least one heating element for heating the aerosol-generating substrate in the cavity to generate an aerosol; at least one air inlet; at least one air outlet; an airflow pathway extending from the at least one air inlet, through the cavity, to the at least one air outlet; means for determining the resistance-to-draw of the airflow pathway; and means for automatically adjusting the resistance-to-draw of the airflow pathway in dependence on the determined resistance-to-draw.

BRIEF DESCRIPTION OF THE DRAWINGS

The invention will be further described, by way of example only, with reference to the accompanying drawings in which.

DETAILED DESCRIPTION

Figure 1:
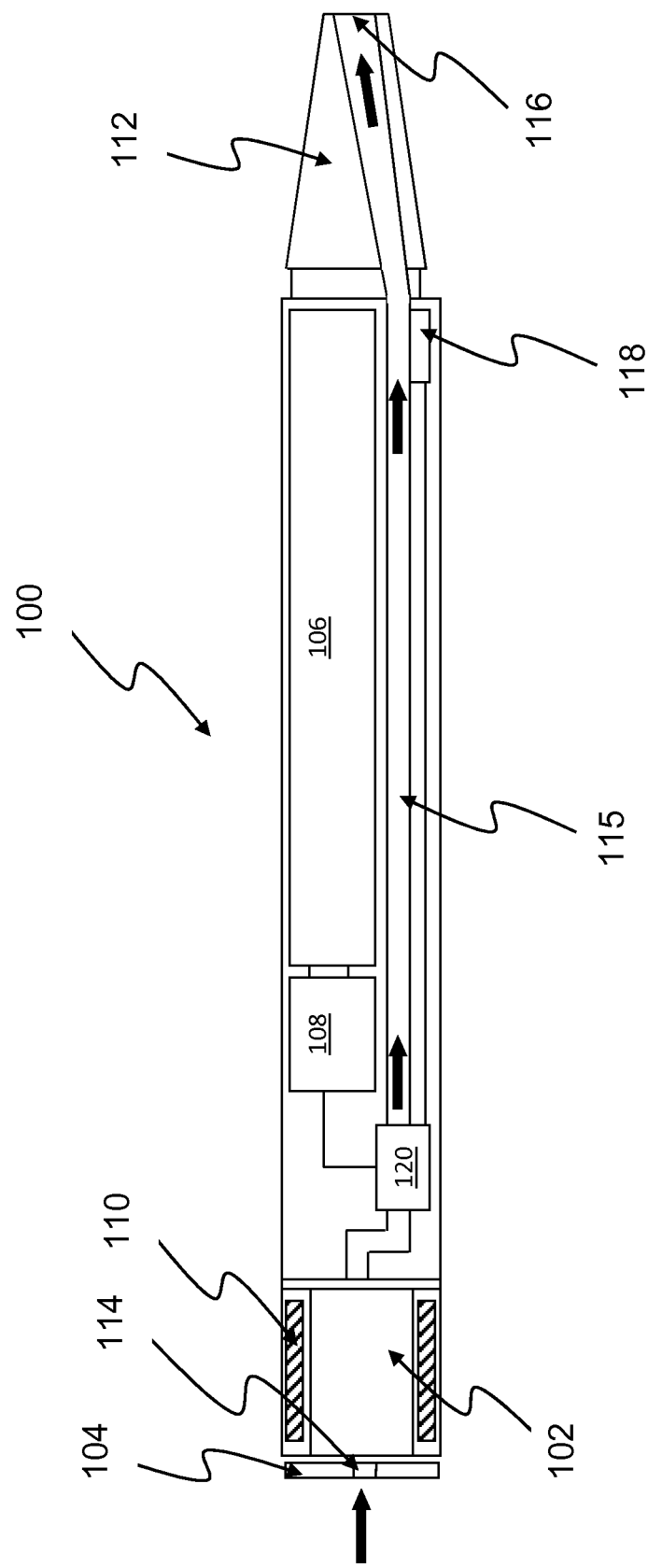
FIG. 1 shows a schematic representation of an aerosol-generating device according to the present invention.

Advantageously, providing both means for determining the resistance-to-draw (RTD) of the airflow pathway, and means for adjusting the RTD in dependence on that determined RTD, enables the device to provide the user with a more consistent user experience, both between uses, and during use. It has been found that due to inconsistencies in the aerosol-forming substrate, such as porosity, humidity, and size that the RTD can vary between uses of the device. In addition, it has been found that during each use the RTD varies as the aerosol-forming substrate dries out. The present invention mitigates these disadvantages by enabling the RTD to be varied without user intervention during use.

As used herein, the term 'aerosol-generating device' is used to describe a device that interacts with an aerosol-forming substrate to generate an aerosol that is directly inhalable into a user's lungs thorough the user's mouth.

In a preferred embodiment, the adjusting means is configured to automatically maintain the resistance-to-draw of the airflow pathway within a range. The adjusting means is preferably configured to automatically maintain the resistance-to-draw within the range of about 75 mmWG to about 110 mmWG, and more preferably within the range of about 80 mmWG and about 100 mmWG. The range of RTD may be configured to approximate a conventional lit-end cigarette.

As used herein, the term "resistance-to-draw" refers to the pressure required to force air through the full length of the object under test at the rate of 17.5 ml/sec at 22 degrees Celsius and 101 kPa (760 Torr), is typically expressed in units of millimetres water gauge (mmWG) and is measured in accordance with ISO 6565:2011.

As will be appreciated, during use of the aerosol-generating device it is not possible to use the standard ISO 6565:2011 method to measure RTD. Therefore, the means for determining the RTD provided in the device is calibrated, against the ISO 6565:2011 method, such that it provides an approximation of the actual RTD.

In addition to providing the user with a more consistent user experience, enabling the RTD of the device to be controlled, may allow the quantity of aerosol-forming substrate aerosolised to be controlled. It has been found that there is a correlation between the RTD of the device and the quantity of aerosol formed. In addition, enabling the RTD of the device to be controlled, may allow the droplet size of the aerosol to be controlled. It has been found that there is a correlation between the RTD of the device and the droplet size of aerosol formed. For example, this may affect the mouth-feel of the inhaled aerosol.

The adjusting means may comprise an adjustable constriction in the airflow pathway, and in particular the adjustable constriction may be an adjustable orifice. The adjustable constriction may be a flexible portion of the airflow pathway such that an external force can be applied to the flexible portion to cause a controllable constriction in the airflow pathway. Where the adjustable constriction is an adjustable orifice the adjustable orifice may be an iris, an iris diaphragm, or a shutter. In a preferred embodiment, the adjustable orifice is an iris diaphragm. The iris diaphragm may have any suitable numbers of leaves, for example between 5 and 11 or more.

The electrically heated aerosol-generating system preferably further comprises: a power supply for supplying power to the electrical heater; electrical hardware connected to the power supply and the electrical heater; and a controller configured to control the supply of electrical power from the power supply to the electrical heater.

The means for determining the resistance-to-draw preferably includes a pressure sensor. The pressure sensor may be a capacitive sensor, a piezoelectric sensor or an electromagnetic sensor. In particular, a capacitive sensor may be used as these are most suitable to the low pressures being measured.

The resistance-to-draw may be determined by: correlating the pressure sensor output to a resistance-to-draw using a look-up table; or by evaluating a polynomial formula dependent on the pressure sensor output.

The means for determining the RTD of the airflow pathway is preferably provided downstream of the cavity. The means for adjusting the RTD may be provided upstream or downstream of the cavity.

As used herein, the term 'downstream' is used to refer to the direction of air flow from the air inlet to the air outlet, and the term 'upstream' is a direction opposite to 'downstream'. Thus, the downstream end of the aerosol-generating device is the end on which the user draws, such as the mouthpiece end.

The at least one air inlet may be provided at any position upstream of the cavity. In one embodiment, the at least one air inlet is provided in the cavity side wall. The device may comprise one, two, three, four, five or more air inlets.

The at least one air outlet is provided at the downstream end of the airflow pathway. The device may comprise one, two, three, four, five or more air inlets.

The controller is preferably further configured to control the adjusting means, the adjusting means being electrically operated. The controller is preferably configured to operate as a proportional controller. That is, the greater the difference between the determined RTD and the target RTD, the greater the change made to the adjusting means to compensate. In this way, the device is less likely to overshoot, or undershoot the target RTDs, and thus may improve the user experience.

In use, the user draws on the air outlet of the device. Due to the restrictions in the airflow pathway of the aerosol-forming substrate, the means for adjusting the RTD and the remainder of the airflow pathway itself, a pressure drop is generated across the device. As described above, the means for determining the RTD is calibrated to utilise the pressure drop to determine the RTD. In dependence on the determined RTD, the adjusting means adjusts the airflow pathway to maintain the RTD at a pre-determined value, or within a pre-determined range of values.

The controller may be configured to determine the resistance-to-draw during a first puff, and automatically control the adjusting means between the first puff and a second puff to adjust the resistance-to-draw for the second puff in dependence on the determined resistance-to-draw of the first puff. As will be appreciated, this control method may be implemented for each puff such that the previous puff informs the subsequent puff.

As used herein, the term 'puff' is used to refer to the event of the user drawing on the aerosol-generating device. Each puff may last for between about 1 second and about 3 seconds, and in one example lasts for about 2 seconds. During use, the user may initiate a puff every about 20 seconds to about 60 seconds, and in one example the user initiates a puff every about 40 seconds.

The controller may be configured to enable one of a plurality of pre-determined RTDs, or RTD ranges, to be selected by the user. The plurality of pre-determined ranges may be a first range, second range, and a third range selectable by the user based on user preference.

Advantageously, this enables a single device to be provided for both users who desire a higher RTD and users who require a lower RTD. The range may be a set error band about a pre-determined value, for example plus or minus 5% of the required pre-determined value.

Where the adjusting means is an adjustable constriction, if the RTD is higher than the required value, or is higher than the high end of the range, the constriction is opened. If the RTD is lower than the required value, or is lower than the low end of the range, the constriction is closed.

In an alternative embodiment, the aerosol-generating device comprises a mechanically operated pressure compensated flow valve configured to maintain the air flow rate through the valve in dependence on the pressure difference across the valve. The pressure compensated flow valve comprises both the means for determining the RTD, and the means for adjusting the RTD. Such a control valve preferably comprises an adjustable variable orifice, the adjusting means, placed in series with a compensator, the determining means. The compensator automatically adjusts to varying inlet and load pressures, maintaining an essentially constant flow rate under these operating conditions. This type of valve can therefore enable a substantially constant pressure drop from the air inlet to the air outlet.

The mechanically operated pressure compensated flow valve preferably comprises a spring, such as a helical spring, having a spring coefficient to set the pressure difference across the valve. Advantageously, a range of springs, each having a different spring coefficient, may be available to provide the user with a range of devices having different RTDs.

Preferably, the electrical heater is provided adjacent at least one wall, preferably a side wall of the cavity. The electrical heater may be provided substantially entirely around the periphery of the cavity. In addition, or alternatively, the electrical heater may be provided on the bottom wall of the cavity. The bottom wall being the wall opposite the open end of the cavity for receiving the aerosol-forming substrate.

The electrical heater may comprise one or more heating elements. For example, the electrical heater may comprise, two, three, four, five, six, seven, eight or more heating elements.

The electrical heater is preferably a foil heater. The electrical heater may be a thin-film heater, such as a polyimide heater. The electrical heater is preferably bonded to the external wall, or walls, of the cavity.

The one or more heating elements preferably comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics.

Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium- titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Examples of suitable composite heating elements are disclosed in U.S. Pat. No. 5,498,855, WO-A-03/095688 and U.S. Pat. No. 5,514,630.

The controller is preferably configured to maintain an operating temperature of the electrical heater between about 180 degrees C. and about 300 degrees C. In one embodiment, the device further comprises a user input, configured to receive a user preference. In this embodiment, the controller is configured to control the temperature of the electrical heater in dependence on the user input. The controller may be configured to receive two, three, four, five or more signals from the input, each signal corresponding to a distinct user preference. For example, the controller may be configured to receive three signals corresponding to electrical heater temperatures of about 190 degrees C., about 200 degrees C. and about 210 degrees C. The controller may be configured to control the temperature of the electrical heater at any other set of suitable temperatures.

The controller may be configured to continuously provide power to the electrical heater. Alternatively, or in addition, the device may further comprise a puff detector configured to detect when a user puffs on the device. The means for determining the RTD is preferably further configured to detect when a user puffs on the device such that it also operates as a puff detector. When the user puffs on the device, the controller is configured to provide power to the electrical heater. In one embodiment, the controller is configured to heat the electrical heater to a first temperature, and then provide additional power to the electrical heater, when a puff is detected, to increase the temperature to a second temperature. In addition, the controller may only be configured to control the adjusting means when a puff is detected.

Preferably, the controller is a programmable controller, for example, a microcontroller, for controlling operation of the electrical heater and the means for adjusting the RTD of the airflow pathway. In one embodiment, the controller may be programmable by software. Alternatively, the controller may comprise application specific hardware, such as an Application-Specific Integrated-Circuit (ASIC), which may be programmable by customising the logic blocks within the hardware for a particular application. Preferably, the electrical hardware comprises a processor. Additionally, the electrical hardware may comprise memory for storing heating preferences for particular aerosol-forming substrates, user preferences, user smoking habits or other information. Preferably, the information stored can be updated and replaced depending on the particular aerosol-forming substrates usable with the smoking system. Also, the information may be downloaded from the system.

The aerosol-generating device preferably comprises a user activated switch, for activating power to be supplied to the electrical heater.

The bottom wall of the cavity, opposite the open side of the cavity, may be porous or may comprise an air inlet.

The aerosol-generating device may comprise a mouthpiece having the at least one air outlet. In one embodiment, the mouthpiece is provided at a proximal end of the device, and the cavity is provided at a distal end. In this way, the air flow pathway length is maximised which may allow the aerosol to cool to a more appropriate temperature for inhalation by the user.

The device preferably comprises a lid for covering the cavity when the device is in use. The lid may be retained by any suitable means, such as magnets, such as neodymium magnets, or a screw thread. The lid may comprise the at least one air inlet.

According to a further aspect of the present invention, there is provided an aerosol-generating system. The system comprises an aerosol-generating device as described herein, and an aerosol-generating substrate comprising tobacco. The tobacco is preferably at least one of: pipe tobacco; cut filler; reconstituted tobacco; and homogenized tobacco.

As used herein, the term 'aerosol-forming substrate' is used to describe a substrate capable of releasing upon heating volatile compounds, which can form an aerosol. The aerosols generated from aerosol-forming substrates according to the invention may be visible or invisible and may include vapours (for example, fine particles of substances, which are in a gaseous state, that are ordinarily liquid or solid at room temperature) as well as gases and liquid droplets of condensed vapours.

The aerosol-forming substrate may comprise an aerosol-former. The aerosol-forming substrate preferably comprises: homogenised tobacco material; aerosol-former; and water. Providing homogenised tobacco material improves the aerosol generation, the nicotine content and the flavour profile. This is because the process of making the homogenised tobacco involves grinding tobacco leaf which enables the release of nicotine and flavours upon heating much more effectively.

The homegenised tobacco material is preferably provided in sheets which are: folded; crimped; or cut into strips. In a particularly preferred embodiment, the sheets are cut into strips having a width of between about 0.2 mm and about 2 mm, more preferably between about 0.4 mm and about 1.2 mm. In one embodiment, the width of the strips is about 0.9 mm.

Alternatively, the homogenised tobacco material may be formed into spheres, using spheronization. The mean diameter of the spheres is preferably between about 0.5 mm and about 4 mm, more preferably between about 0.8 mm and about 3 mm.

The aerosol-forming substrate preferably comprises: homogenised tobacco material between about 55% and about 75% by weight; aerosol-former between about 15% and about 25% by weight; and water between about 10% and about 20% by weight.

Before measuring the samples of aerosol-forming substrate they are equilibrated for 48 hours at 50% relative humidity at 22 degrees C. The Karl Fischer technique is used to determine the water content of the homogenised tobacco material.

The aerosol-forming substrate may further comprise a flavourant between about 0.1% and about 10% by weight. The flavourant may be any suitable flavourant known in the art, such as menthol.

Sheets of homogenised tobacco material for use in the invention may be formed by agglomerating particulate tobacco obtained by grinding or otherwise comminuting one or both of tobacco leaf lamina and tobacco leaf stems.

Sheets of homogenised tobacco material for use in the invention may comprise one or more intrinsic binders that is a tobacco endogenous binder, one or more extrinsic binders that is a tobacco exogenous binder, or a combination thereof to help agglomerate the particulate tobacco. Alternatively, or in addition, sheets of homogenised tobacco material for use in the invention may comprise other additives including, but not limited to, tobacco and non-tobacco fibres, flavourants, fillers, aqueous and non-aqueous solvents and combinations thereof.

Suitable extrinsic binders for inclusion in sheets of homogenised tobacco material for use in the invention are known in the art and include, but are not limited to: gums such as, for example, guar gum, xanthan gum, arabic gum and locust bean gum; cellulosic binders such as, for example, hydroxypropyl cellulose, carboxymethyl cellulose, hydroxyethyl cellulose, methyl cellulose and ethyl cellulose; polysaccharides such as, for example, starches, organic acids, such as alginic acid, conjugate base salts of organic acids, such as sodium-alginate, agar and 30 pectins; and combinations thereof.

A number of reconstitution processes for producing sheets of homogenised tobacco materials are known in the art. These include, but are not limited to: paper-making processes of the type described in, for example, U.S. Pat. No. 3,860,012; casting or 'cast leaf' processes of the type described in, for example, U.S. Pat. No. 5,724,998; dough reconstitution processes of the type described in, for example, U.S. Pat. No. 3,894,544; and extrusion processes of the type described in, for example, in GB-A-983,928. Typically, the densities of sheets of homogenised tobacco material produced by extrusion processes and dough reconstitution processes are greater than the densities of sheets of homogenised tobacco materials produced by casting processes.

Sheets of homogenised tobacco material for use in the invention are preferably formed by a casting process of the type generally comprising casting a slurry comprising particulate tobacco and one or more binders onto a conveyor belt or other support surface, drying the cast slurry to form a sheet of homogenised tobacco material and removing the sheet of homogenised tobacco material from the support surface.

The homogenised tobacco sheet material may be produced using different types of tobacco. For example, tobacco sheet material may be formed using tobaccos from a number of different varieties of tobacco, or tobacco from different regions of the tobacco plant, such as leaves or stem. After processing, the sheet has consistent properties and a homogenised flavour. A single sheet of homogenised tobacco material may be produced to have a specific flavour. To produce a product having a different flavour, a different tobacco sheet material needs to be produced. Some flavours that are produced by blending a large number of different shredded tobaccos in a conventional cigarette may be difficult to replicate in a single homogenised tobacco sheet. For example, Virginia tobaccos and Burley tobaccos may need to be processed in different ways to optimise their individual flavours. It may not be possible to replicate a particular blend of Virginia and Burley tobaccos in a single sheet of homogenised tobacco material. As such, the sachet may comprise a first homogenised tobacco material and a second homogenised tobacco material. By combining two different sheets of tobacco material in a single sachet, new blends may be created that could not be produced by a single sheet of homogenised tobacco.

The aerosol-former preferably comprises at least one polyhydric alcohol. In a preferred embodiment, the aerosol-former comprises at least one of: triethylene glycol; 1,3-butanediol; propylene glycol; and glycerine.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

As shown in FIG. 1, the aerosol-generating device 100 comprises a cavity 102 for receiving an aerosol-generating substrate, a lid 104 for covering the cavity 102, a power supply 106, a controller 108, an electrical heater 110 and a mouthpiece 112. The device further comprises an air inlet 114 provided in the lid 104, an air outlet 116 provided in the mouthpiece 112, and an airflow pathway 115 extending from the air inlet to the air outlet, via the cavity 102. The airflow through the airflow pathway 115 is represented by the arrows. The device further comprises a pressure sensor 118 configured to measure the variation in air pressure in the airflow pathway 115 during use of the device. The pressure sensor 118 is provided at the downstream end of the device, adjacent the mouthpiece end. An electrically operated means 120 for adjusting the resistance-to-draw of the device is also provided. The adjusting means 120 is positioned within the airflow pathway 115, and downstream of the cavity 102. The mouthpiece may be removable for cleaning, or replacement as may be necessary.

The controller 108 is configured to provide power to the electrical heater 110 from the power supply 106 to heat the aerosol-forming substrate to an operating temperature. As can be seen, the electrical heater is provided around the periphery of the cavity to improve the heat conduction from the heater to the cavity wall and then to the aerosol-forming substrate.

The device may further comprise a user activated switch (not shown) for activating the device.

In use, the user inserts aerosol-forming substrate into the cavity 102, replaces the lid 104 to close the cavity, and then activates the device. The controller then provides power to the electrical heater to increase the temperature of the aerosol-forming substrate to the operating temperature. In one example, the operating temperature is about 200 degrees C.

Once the aerosol-forming substrate reaches the operating temperature the user draws on the mouthpiece, and air is drawn through the device from the air inlet 114, through the cavity 102, through the adjusting means 120, along the airflow pathway 115 adjacent the power supply 106 and out of the air outlet 116 in the mouthpiece 112.

The aerosol-forming substrate in the cavity 102, and the airflow pathway 115 will result in a resistance-to-draw experienced by the user drawing on the mouthpiece. The component of the resistance-to-draw resulting from the airflow pathway can be measured, and will not significantly vary from use-to-use or during a single use. However, the component of the resistance-to-draw resulting from the aerosol-forming substrate within the cavity 102 will depend on many factors only in the control of the user, and in particular the quantity of tobacco placed in the cavity, and how much the user compresses the tobacco when providing it in the cavity. To overcome this problem, and provide the user with a consistent resistance-to-draw between uses, the adjusting means 120 is configured to enable the RTD of the device to be adjusted automatically during use.

Figure 2:
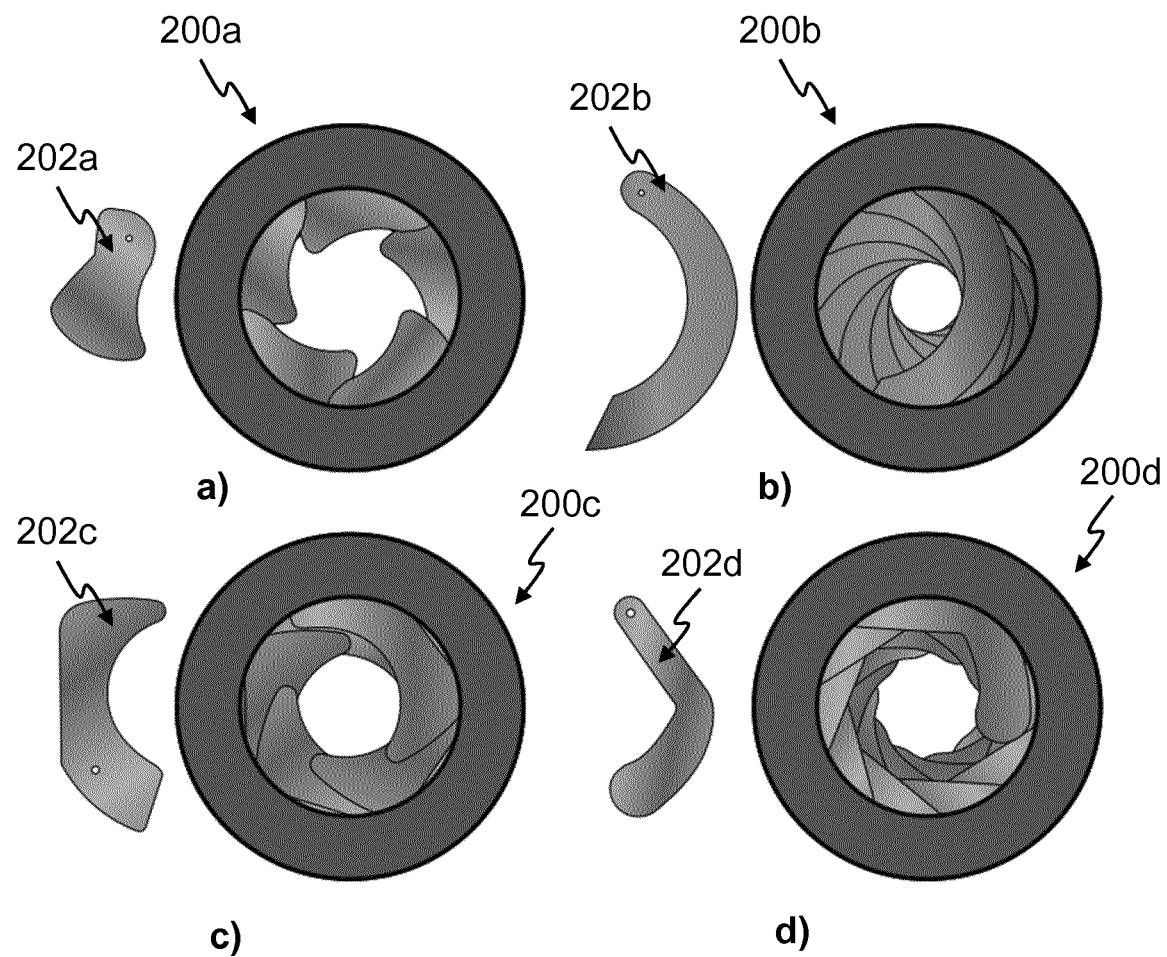
FIG. 2 show four alternative iris diaphragms suitable for use in the device of FIG. 1.

As shown in FIG. 2, the adjusting means, in this example, is an iris diaphragm 200a, 200b, 200c, 200d. The iris diaphragm 200 may have any suitable number of leaves 202a, 202b, 202c, 202d having any desired shape. As can be seen, the shape of orifice formed by the iris diaphragm is dependent on the shape of the leaves 202. The iris diaphragm 200 further comprises a motor (not shown), such as a stepper motor, configured to open and close the iris as required. As will be appreciated, the iris provides an adjustable constriction within the airflow pathway 115 which can be used to control the RTD of the device.

Figure 3:
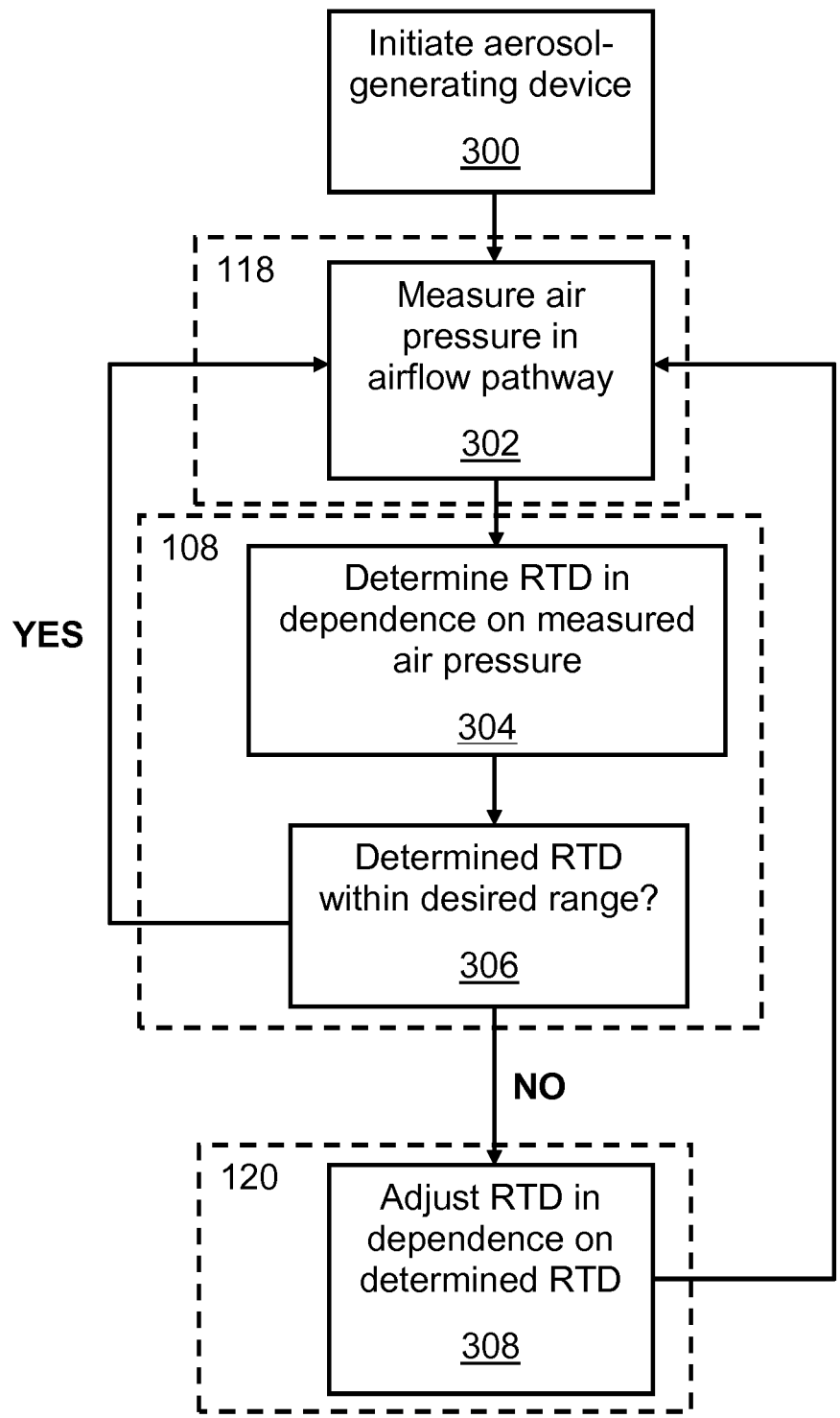
FIG. 3 is a flow diagram showing the control process of the aerosol-generating device of FIG. 1.

FIG. 3 shows a flow diagram of the control process of controller 108. In use, the user activates the device, step 300, by either activating the switch, if provided, or by drawing on the mouthpiece. If a switch is not provided, the pressure sensor is configured to operate as a puff detector to determine when the user is drawing on the device.

In step 302, when the user is drawing on the device, the air pressure in the airflow pathway 115 is measured by the pressure sensor 118. The controller 108 receives the pressure sensor output, and determines the RTD of that first puff event in dependence on that measured pressure input.

In step 304, the controller 108, in one example, determines the RTD of that first puff event by correlating the pressure sensor output to an RTD using a look-up table. The look-up table is generated by calibrating the pressure sensor outputs with varying RTD using the standard, ISO 6565: 2011, RTD measurement method described above.

In step 306, the controller compares the determined RTD of the first puff event with the pre-determined range of RTDs. In one example, the pre-determined range of RTD is about 80 mmWG to about 100 mmWG. If the RTD is within the range, the process reverts back to step 302, and, for the next puff event, measures the air pressure in the airflow pathway. No adjustment is made to change the RTD of the device. If the determined RTD is without the range, the process continues to step 308.

In step 308, the controller signals the adjusting means 120 to adjust the airflow pathway to alter the RTD for the next puff. This process occurs between puff events. If the determined RTD is below the lower end of the range, the controller signals the adjusting means 120 to further constrict the airflow pathway. If the determined RTD is above the upper end of the range, the controller signals the adjusting means 120 to reduce the constriction in the airflow pathway. The process then reverts back to step 302, to measure the air pressure in the airflow pathway of the next puff event, such that a feedback loop is generated to automatically control the RTD of the device.

The invention claimed is:

1. An electrically heated aerosol-generating device, comprising:
   an outer housing having a cavity configured to receive an aerosol-generating substrate;
   an electrical heater comprising at least one heating element configured to heat the aerosol-generating substrate in the cavity to generate an aerosol;
   at least one air inlet;
   at least one air outlet;
   an airflow pathway extending from the at least one air inlet, through the cavity, to the at least one air outlet;
   a pressure sensor configured to determine a resistance-to-draw of the airflow pathway; and
   an adjustable constriction in the airflow pathway configured to automatically adjust the resistance-to-draw of the airflow pathway in dependence on the resistance-to-draw determined by the pressure sensor.

2. The electrically heated aerosol-generating device according to claim 1, wherein the adjustable constriction is further configured to maintain the resistance-to-draw of the airflow pathway within a predetermined range.

3. The electrically heated aerosol-generating device according to claim 2, wherein the predetermined range of the resistance-to-draw is between about 80 mm WG and about 100 mm WG.

4. The electrically heated aerosol-generating device according to claim 1, wherein the adjustable constriction comprises an adjustable orifice.

5. The electrically heated aerosol-generating device according to claim 4, wherein the adjustable orifice is an iris diaphragm.

6. An electrically heated aerosol-generating system, comprising:
   an electrically heated aerosol-generating device, comprising:
      an outer housing having a cavity configured to receive an aerosol-generating substrate,
      an electrical heater comprising at least one heating element configured to heat the aerosol-generating substrate in the cavity to generate an aerosol,
      at least one air inlet,
      at least one air outlet,
      an airflow pathway extending from the at least one air inlet, through the cavity to the at least one air outlet,
      a pressure sensor configured to determine a resistance-to-draw of the airflow pathway, and
      an adjustable constriction in the airflow pathway configured to automatically adjust the resistance-to-draw of the airflow pathway in dependence on the resistance-to-draw determined by the pressure sensor;
   a power supply configured to supply power to the electrical heater;
   electrical hardware connected to the power supply and the electrical heater; and
   a controller configured to control the supply of electrical power from the power supply to the electrical heater.

7. The electrically heated aerosol-generating system according to claim 6, wherein the resistance-to-draw is determined by correlating the pressure sensor output to the resistance-to-draw.

8. The electrically heated aerosol-generating system according to claim 6, wherein the controller is further configured to control the adjustable constriction in the airflow pathway, the adjustable constriction in the airflow pathway being electrically operated.

9. The electrically heated aerosol-generating system according to claim 8, wherein the controller is configured to determine the resistance-to-draw during a first puff, and to automatically control the adjustable constriction in the airflow pathway between the first puff and a second puff to adjust the resistance-to-draw for the second puff in dependence on the determined resistance-to-draw of the first puff.

10. The electrically heated aerosol-generating device according to claim 1, further comprising a mechanically operated pressure compensated flow valve configured to maintain an air flow rate through the valve in dependence on a pressure difference across the valve.

11. The electrically heated aerosol-generating device according to claim 10, wherein the mechanically operated pressure compensated flow valve comprises a spring having a spring coefficient to set the pressure difference across the valve.

12. The electrically heated aerosol-generating device according to claim 1, wherein the electrical heater is provided adjacent at least one wall of the cavity.

13. An electrically heated aerosol-generating system, comprising:
- an electrically heated aerosol-generating device, comprising:
  - an outer housing having a cavity configured to receive an aerosol-generating substrate,
  - an electrical heater comprising at least one heating element configured to heat the aerosol-generating substrate in the cavity to generate an aerosol,
  - at least one air inlet,
  - at least one air outlet,
  - an airflow pathway extending from the at least one air inlet, through the cavity, to the at least one air outlet,
  - a pressure sensor configured to determine a resistance-to-draw of the airflow pathway, and
  - an adjustable constriction in the airflow pathway configured to automatically adjust the resistance-to-draw of the airflow pathway in dependence on the resistance-to-draw determined by the pressure sensor,
- wherein the aerosol-generating substrate comprises tobacco.

14. The electrically heated aerosol-generating system according claim 13, wherein the tobacco is at least one of: pipe tobacco, cut filler, reconstituted tobacco, and homogenized tobacco.

* * * * *